(12) United States Patent
Park et al.

(10) Patent No.: US 7,590,435 B2
(45) Date of Patent: Sep. 15, 2009

(54) LOCKING APPARATUS OF SWING HINGE MODULE FOR MOBILE COMMUNICATION TERMINALS

(75) Inventors: Hyun-Gue Park, Seoul (KR); Byoung-Soo Lee, Yongin-si (KR); Young-Mok Jeun, Seoul (KR)

(73) Assignee: Samsung Electronics Co., Ltd (KR)

( * ) Notice: Subject to any disclaimer, the term of this patent is extended or adjusted under 35 U.S.C. 154(b) by 698 days.

(21) Appl. No.: 11/132,911

(22) Filed: May 19, 2005

(65) Prior Publication Data

US 2006/0019726 A1      Jan. 26, 2006

(30) Foreign Application Priority Data

Jul. 7, 2004     (KR) ...................... 10-2004-0052778
Oct. 11, 2004   (KR) ...................... 10-2004-0081123

(51) Int. Cl.
*H04M 1/00*      (2006.01)

(52) U.S. Cl. ................ 455/575.3; 455/347; 379/433.07

(58) Field of Classification Search ................ 455/351, 455/450.1, 575.1, 575.2, 575.3, 575.4, 347–349; 379/433.01, 433.04, 433.05–433.07, 433.11, 379/433.12, 454, 455
See application file for complete search history.

(56) References Cited

U.S. PATENT DOCUMENTS

| | | | | |
|---|---|---|---|---|
| 5,485,517 | A | | 1/1996 | Gray |
| 6,065,187 | A | * | 5/2000 | Mischenko ................... 16/341 |
| 6,633,643 | B1 | * | 10/2003 | Ona ....................... 379/433.13 |
| 6,886,221 | B2 | * | 5/2005 | Minami et al. ................ 16/324 |
| 7,085,375 | B2 | * | 8/2006 | Katoh .................... 379/433.13 |
| 7,213,301 | B2 | * | 5/2007 | Sakai et al. .................... 16/303 |
| 7,299,524 | B2 | * | 11/2007 | Luo ............................. 16/303 |
| 2003/0040288 | A1 | | 2/2003 | Kang et al. |

FOREIGN PATENT DOCUMENTS

| | | |
|---|---|---|
| CN | 2641245 | 9/2004 |
| EP | 1 093 274 | 4/2001 |
| EP | 1 353 488 | 10/2003 |
| EP | 1 398 940 | 3/2004 |
| WO | WO 03/078854 | 9/2003 |

\* cited by examiner

*Primary Examiner*—Nhan T Le
(74) *Attorney, Agent, or Firm*—The Farrell Law Firm, LLP

(57) ABSTRACT

Disclosed herein is a locking apparatus of a swing hinge module for mobile communication terminals that is capable of improving a locking force of the swing hinge module, the mobile communication terminal including first and second housings rotatably connected to each other by the swing hinge module. The swing hinge module includes a locking apparatus having a hinge cap extending in the longitudinal direction thereof and having a closed end formed such that a head of the hinge shaft is inserted through the closed end of the hinge cap and an open end formed such that the hinge cap is attached to the hinge housing while the hinge cap surrounds the outer circumference of the hinge housing through the open end of the hinge cap, and a hinge fixing plate engaged with the head of the hinge shaft while opposite to the hinge cap such that the hinge housing and the hinge cap are fixed to each other by means of the hinge fixing plate while being rotated relative to the hinge fixing plate.

23 Claims, 16 Drawing Sheets

LOCKING APPARATUS OF SWING HINGE MODULE FOR MOBILE COMMUNICATION TERMINALS

PRIORITY

This application claims priority to an application entitled "LOCKING APPARATUS OF A SWING HINGE MODULE FOR MOBILE COMMUNICATION TERMINALS," filed in the Korean Intellectual Property Office on Jul. 7, 2004 and assigned Serial No. 2004-52778, and another application entitled "LOCKING APPARATUS OF SWING HINGE MODULE FOR MOBILE COMMUNICATION TERMINALS," filed in the Korean Intellectual Property Office on Oct. 11, 2004 and assigned Serial No. 2004-81123, the contents of which are hereby incorporated by reference.

BACKGROUND OF THE INVENTION

1. Field of the Invention

The present invention relates to a locking apparatus of a swing hinge module for mobile communication terminals, and more particularly to a locking apparatus of a swing hinge module for mobile communication terminals including a hinge fixing plate to fix a hinge shaft of the swing hinge module.

2. Description of the Related Art

Generally, the phrase "portable communication devices" means electronic devices that are portable and enable owners of the devices to communicate through wireless communication. Such portable communication devices include hand held PCs (HHP), CT-2 cellular phones, digital phones, PCS phones, and PDAs. On the basis of their configurations, the portable communication devices may be classified into several types of wireless terminals. For example, the wireless terminals may be basically classified into a bar-type wireless terminal, a flip-type wireless terminal, and a folder-type wireless terminal. The bar-type wireless terminal has a bar-type single housing, the flip-type wireless terminal comprises a bar-type housing and a flip part rotatably attached to the housing by means of a hinge apparatus, and the folder-type wireless terminal comprises a bar-type housing and a folder part rotatably attached to the housing by means of a hinge apparatus.

Such portable communication terminals are each essentially provided with an antenna unit, data input/output units, and data transmitting/receiving units. The data input unit usually includes a keypad with which data is input by way of depressing buttons via a user's fingers or a stylus. Alternatively, a touch pad or a touch screen can be used. The data output unit generally uses an LCD.

The flip-type or folder-type communication terminal as described above are very popular since they provide sound of high sensitivity and are readily available in small sizes and light weights.

A sliding-type or swing-type communication terminal having a pair of housings movable or rotatable open or closed relative to each other while facing each other is also used, which satisfies various applications in demand by the public. In addition, a mobile communication terminal capable of concurrently performing an opening/closing operation of the folder-type terminal and an opening/closing operation of the swing-type terminal has been developed.

Nevertheless, means for perfectly performing an opening/closing operation of each conventional mobile communication terminal has not been provided. Especially for the swing-type communication terminal having a pair of housings rotatable open or closed relative to each other while facing each other, it is troublesomely required that a user of the swing-type communication terminal manually rotate one of the housings up to a position where communication is possible.

In order to solve the problem as described above, a semiautomatic swing-type mobile communication terminal has been proposed. The semiautomatic swing-type mobile communication terminal has a swing hinge module including a hinge housing, a hinge shaft, first and second hinge cams, a coil spring, and a hinge stopper successively disposed in an accommodating space defined in the hinge housing, and a hinge cap to surround the outer circumference of the hinge housing. The hinge cap is securely fixed to one end of the hinge shaft by means of screws. However, the swing hinge module has a problem in that the screws may become loosened as the housings of the swing-type mobile communication terminal are repetitively rotated, and thus a gap between the housings is increased, which lowers rotatability and durability of the swing hinge module.

SUMMARY OF THE INVENTION

Therefore, the present invention has been made in view of the above problem, and it is an object of the present invention to provide a locking apparatus of a swing hinge module for mobile communication terminals that allows semiautomatic repetitive rotation of a pair of housings while the housings face each other, thereby improving a locking force of the swing hinge module.

It is another object of the present invention to provide a locking apparatus of a swing hinge module for mobile communication terminals including a hinge fixing plate to fix a hinge shaft of the swing hinge module, thereby improving a locking force of the swing hinge module, and thus improving durability of the mobile communication terminal.

It is another object of the present invention to provide a locking apparatus of a swing hinge module for mobile communication terminals including a hinge fixing plate to fix a hinge shaft of the swing hinge module, wherein the hinge fixing plate has three fixing points so that fatigue applied to the hinge module is reduced, whereby damage to the hinge module is prevented and the service life of the hinge module is increased.

It is yet another object of the present invention to provide a locking apparatus of a swing hinge module for mobile communication terminals including a hinge stopper that limits the rotation range of a hinge cap as lockers are inserted into or separated from the hinge cap, whereby a function of the swing hinge module as a stopper is improved.

In accordance with one aspect of the present invention, the above and other objects can be accomplished by the provision of a locking apparatus of a swing hinge module for a mobile communication terminal having first and second housings rotatably connected to each other by means of the swing hinge module, the swing hinge module including a hinge housing, a hinge shaft, a hinge cam, and a coil spring, the hinge shaft, the hinge cam and the coil spring being successively disposed in the hinge housing, wherein the locking apparatus includes a hinge cap extending in the longitudinal direction thereof, the hinge cap having a closed end formed such that a head of the hinge shaft is inserted through the closed end of the hinge cap and an open end formed such that the hinge cap is attached to the hinge housing while the hinge cap surrounds the outer circumference of the hinge housing through the open end of the hinge cap; and a hinge fixing plate engaged with the head of the hinge shaft while opposite to the hinge cap such that the hinge housing and the hinge cap are fixed to each other by means of the hinge fixing plate while being rotated relative to the hinge fixing plate.

In accordance with another aspect of the present invention, there is provided a locking apparatus of a swing hinge module for a mobile communication terminal having first and second housings rotatably connected to each other by means of the swing hinge module, the swing hinge module including a hinge housing, a hinge shaft, first and second hinge cams, and a coil spring, the hinge shaft, the first and second hinge cams and the coil spring being successively disposed in the hinge housing, wherein the locking apparatus includes a hinge cap extending in the longitudinal direction thereof, the hinge cap having a closed end formed such that a head of the hinge shaft is inserted through the closed end of the hinge cap and an open end formed such that the hinge cap is attached to the hinge housing while the hinge cap surrounds the outer circumference of the hinge housing through the open end of the hinge cap; a hinge fixing plate engaged with a center part of the head of the hinge shaft while being opposite to the upper end of the hinge cap such that the hinge housing and the first and second hinge cams are fixed to each other by means of the hinge fixing plate; and a hinge stopper inserted into or separated from the hinge cap as the hinge cap is rotated, the hinge stopper contacting the hinge cap when the hinge stopper is separated from the hinge cap for restricting the rotation range of the hinge cap.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of the present invention will be described in detail with reference to the accompanying drawings.

Figure 1:
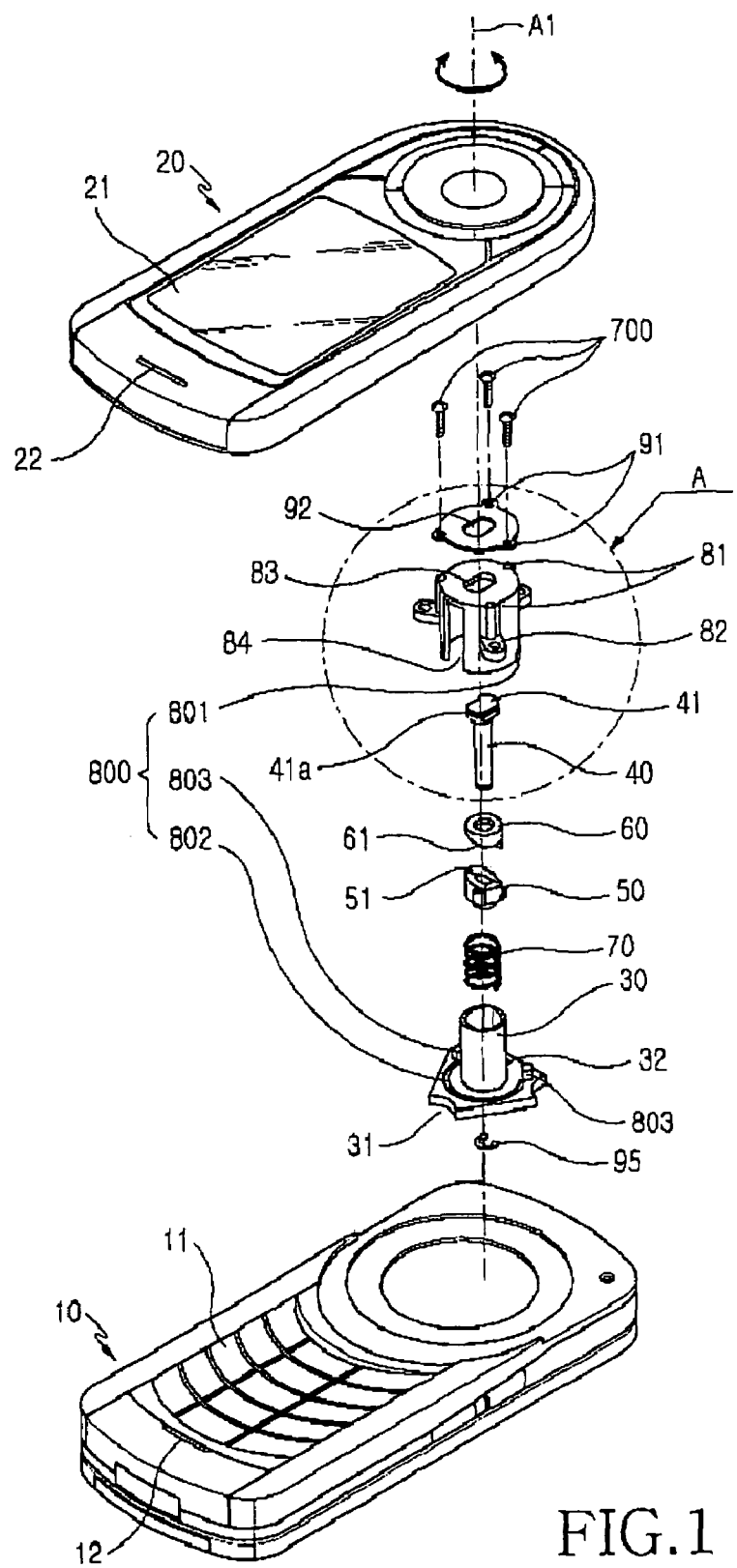
FIG. 1 is an exploded perspective view showing the construction of a locking apparatus of a swing hinge module for mobile communication terminals according to a preferred embodiment of the present invention.

Referring to FIG. 1, a mobile communication terminal includes a first housing 10, which is provided with a plurality of keypads 11 and a microphone 12; and a second housing 20, which is connected to the first housing 10 such that the second housing 20 can be rotated relative to the first housing 10 about a hinge axis A1 while being opposite to the first housing 10. The second housing 20 is provided with a display unit 21 and a speaker 22.

As shown in FIGS. 1 to 10, a swing hinge module for mobile communication terminals includes a hinge housing 30, a hinge shaft 40, first and second hinge cams 50 and 60, a coil spring 70, a hinge cap 80, and a hinge fixing plate 90. The hinge housing 30 extends in the longitudinal direction of the hinge housing 30. The hinge housing 30 is fixed to the first housing 10. The hinge housing 30 has an accommodating space defined therein, in which the hinge shaft 40, the first and second hinge cams 50 and 60, and the coil spring 70 are successively disposed. The hinge shaft 40 is inserted through the first and second hinge cams 50 and 60, which will be described below. The hinge shaft 40 is rotatably attached to the hinge housing 30. The first hinge cam 50 is provided with a crest part 51, which corresponds to a valley part 61 formed on the second hinge cam 60. The first hinge cam 50 is disposed in the accommodating space of the hinge housing 30 such that the first hinge cam 50 can be linearly moved in the longitudinal direction of the hinge housing 30. As described above, the valley part 61 is formed on the second hinge cam 60. The valley part 61 of the second hinge cam 60 corresponds to the crest part 51 of the first hinge cam 50. The second hinge cam 60 is fixedly attached to the hinge shaft 40 such that the second hinge cam 60 can be rotated in the hinge housing 30. The coil spring 70 is disposed between the hinge housing 30 and the first hinge cam 50 for providing an elastic force upon the first hinge cam 50 such that the first and second hinge cams 50 and 60 are moved toward each other. One end of the hinge cap 80 is closed. The closed end of the hinge cap 80 has a cap-side through-hole 83 formed at the center thereof, through which a head 41 of the hinge shaft 40 is inserted. The other end of the hinge cap 80 is open. The hinge housing 30 is attached to the hinge cap 80 through the open end of the hinge cap 80.

Figure 2:
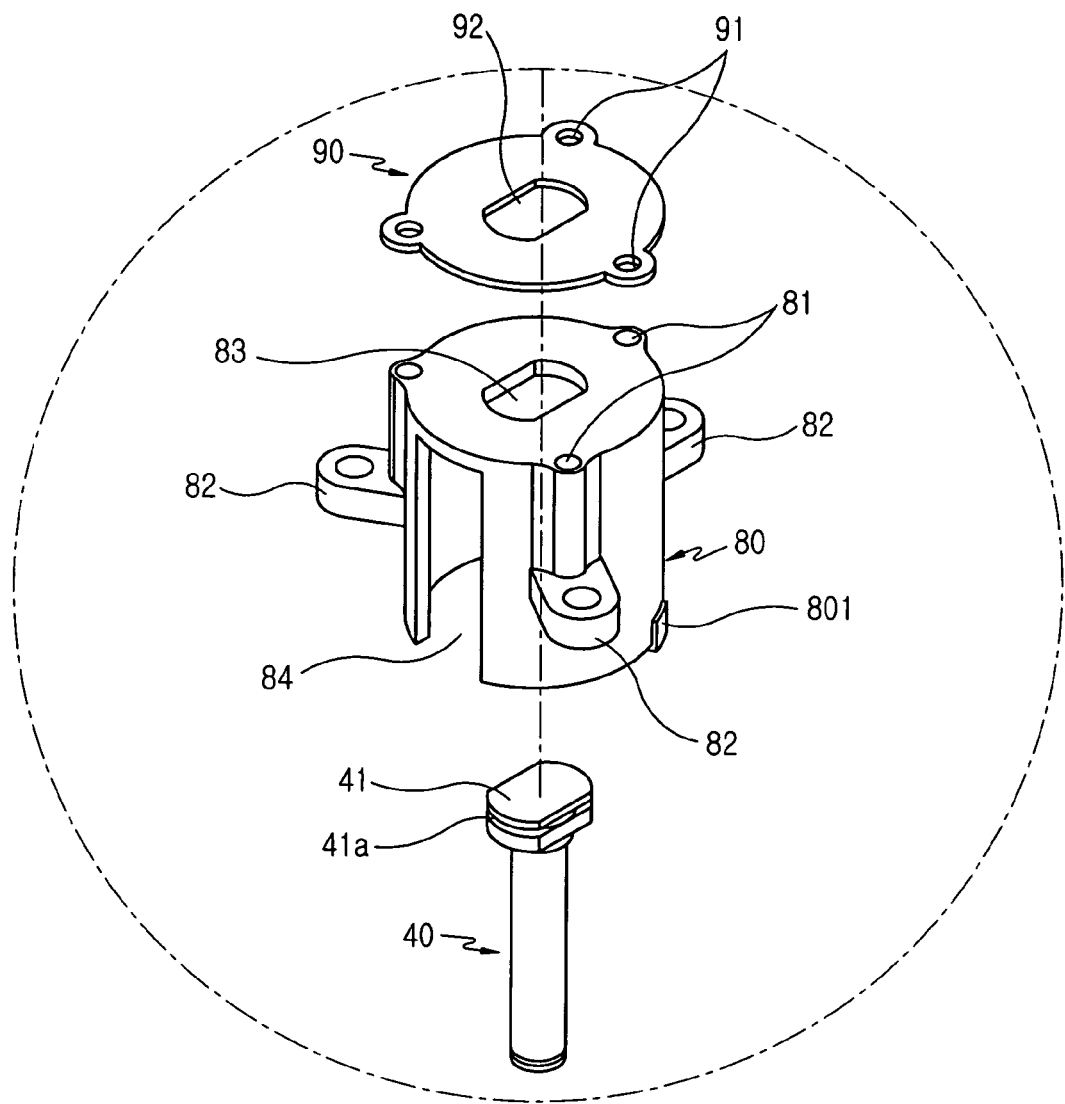
FIG. 2 is an enlarged view showing part A of FIG. 1.
Figure 3:
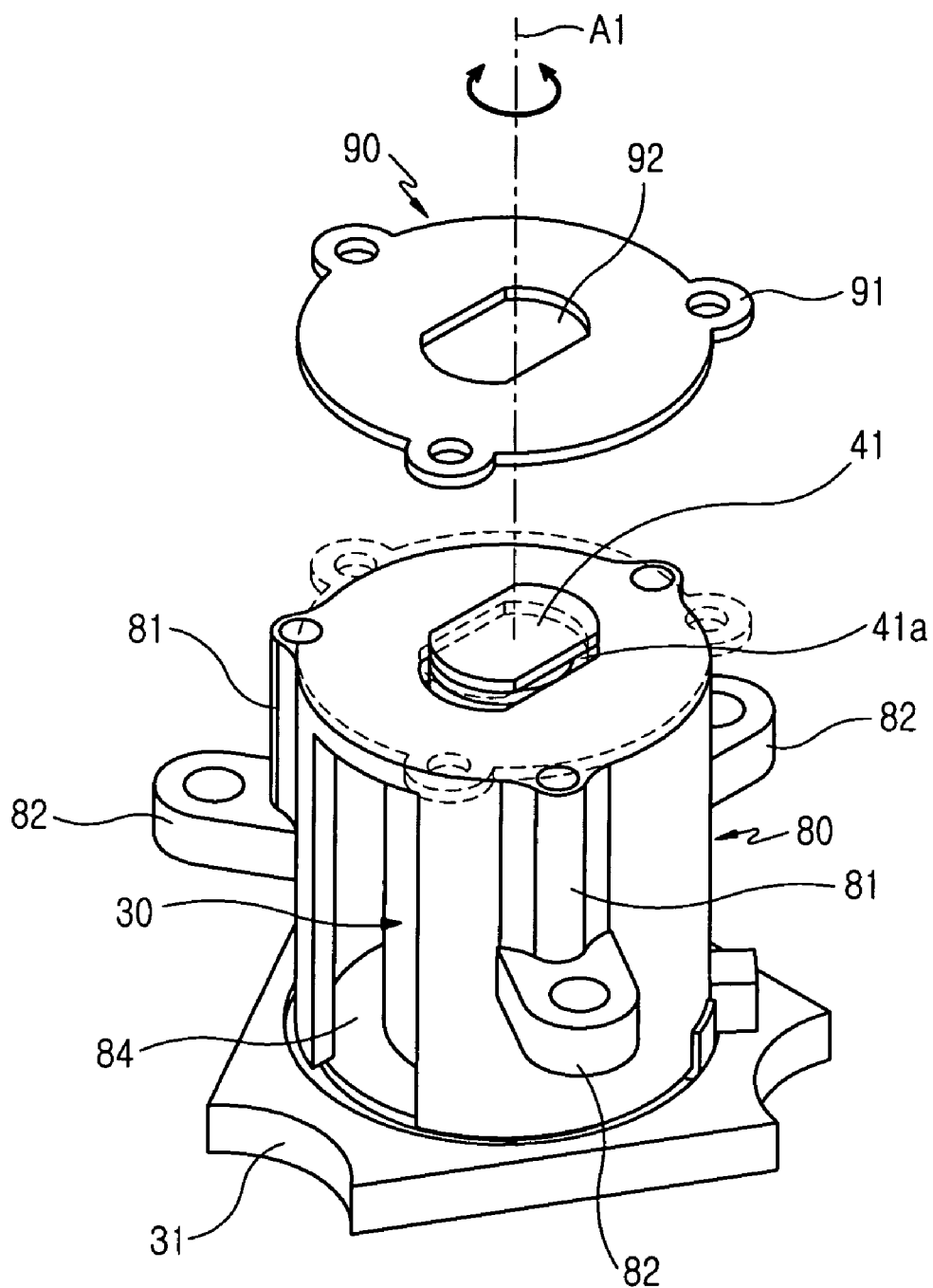
FIG. 3 is a perspective view showing assembly of a hinge cap, a hinge shaft and a hinge fixing plate of the locking apparatus of the swing hinge module for mobile communication terminals according to the preferred embodiment of the present invention.
Figure 4:
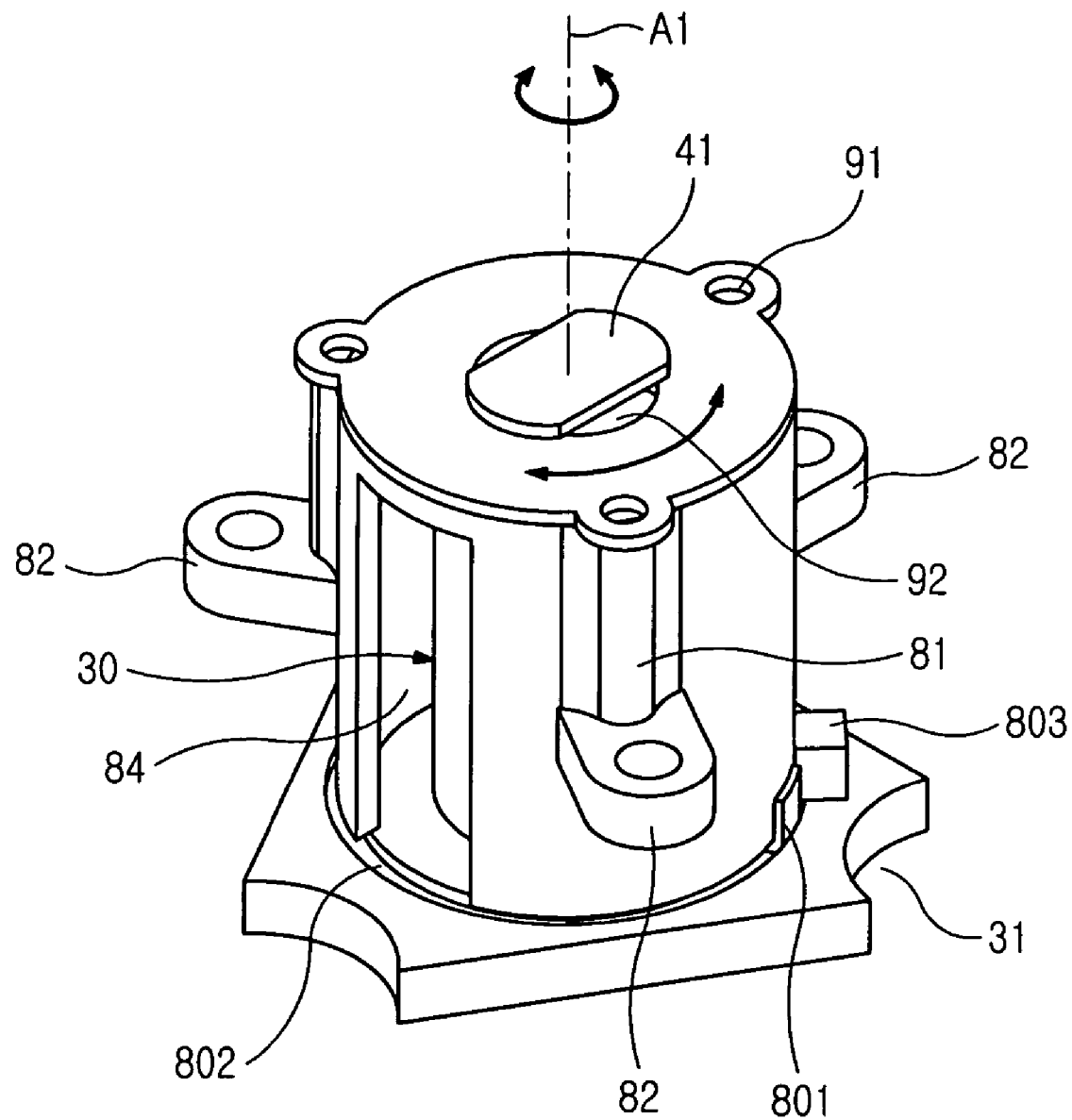
FIG. 4 is a perspective view showing assembly of the hinge cap and the hinge fixing plate of the locking apparatus of the swing hinge module for mobile communication terminals according to the preferred embodiment of the present invention.
Figure 5:
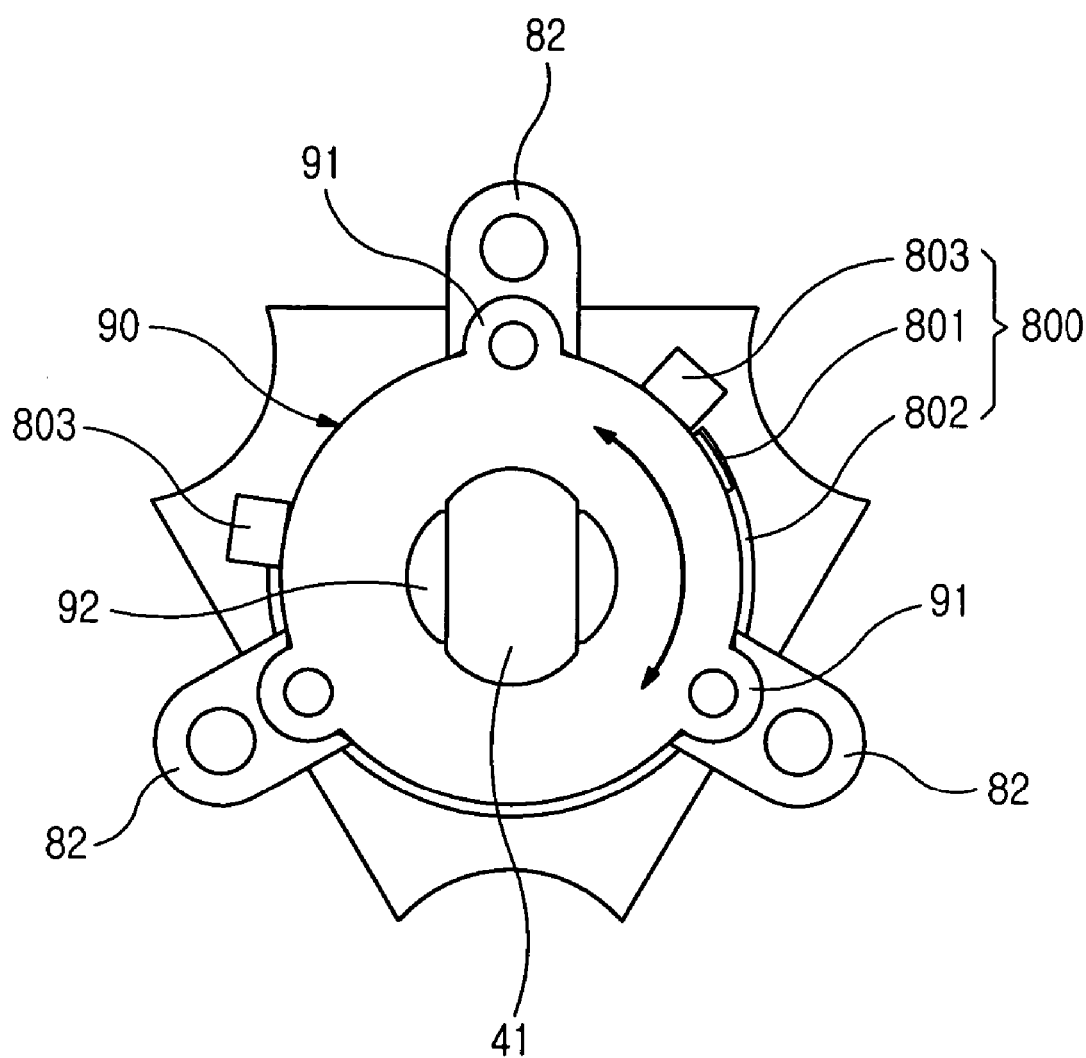
FIG. 5 is a plan view showing assembly of the hinge cap and the hinge fixing plate of the locking apparatus of the swing hinge module for mobile communication terminals according to the preferred embodiment of the present invention.

Referring to FIGS. 3 to 5, the hinge fixing plate 90 has a plate-side through-hole 92 formed at the center thereof, through which the head 41 of the hinge shaft 40 is inserted. The hinge fixing plate 90 is adjacent to the hinge cap 80 with their respective through-holes 83, 92 aligned. The hinge housing 30 and the hinge cap 80 are fixed to each other by means of the hinge fixing plate 90 while being rotated relative to the hinge fixing plate 90. As shown in FIGS. 1 and 2, the hinge cap 80 is provided at the outer circumference thereof with first fixing pieces 81, which extend in the longitudinal direction of the hinge cap 80, and the hinge fixing plate 90 is provided at the outer circumference thereof with second fixing pieces 91, which correspond to the first fixing pieces 81. The first and second fixing pieces 81 and 91 are connected to each other by means of screws 700, as shown in FIG. 1. Also, the hinge cap 80 is provided at the outer circumference thereof with at least one cap-side fixing member 82, by which the hinge cap 80 is fixed to the second housing 20.

As shown in FIGS. 2 to 5, the head 41 of the hinge shaft 40 has a shaft-side engaging groove 41a, with which the hinge fixing plate 90 is engaged after the head 41 of the hinge shaft 40 is inserted through the plate-side through-hole 92 of the hinge fixing plate 90. As shown in FIG. 2, the cap-side through-hole 83 is formed through the center of the closed end of the hinge cap 80. The head 41 of the hinge shaft 40 is inserted through the cap-side through-hole 83 of the hinge cap 80. Similarly, the plate-side through-hole 92 is formed at the center of the hinge fixing plate 90. Consequently, the hinge fixing plate 90 is engaged with the shaft-side engaging groove 41a of the hinge shaft 40 while the head 41 of the hinge shaft 40 is inserted through the plate-side through-hole 92 of the hinge fixing plate 90.

Referring to FIGS. 3 and 5, the first and second fixing pieces 81 and 91 are preferably uniformly spaced apart from their own respective pieces about the hinge axis A1 of the hinge shaft 40 such that the first and second fixing pieces 81 and 91 are both arranged so that they are located at the corners of an equilateral triangle. Consequently, the first and second fixing pieces 81 and 91 are preferably provided with three fixing points, respectively.

Referring to FIGS. 7 to 10, a hinge stopper 800 is disposed between the hinge cap 80 and the hinge housing 30 for restricting the rotation of the hinge cap 80. The hinge stopper 800 includes a guide protrusion 801, a guide groove 802, and at least one stopper protrusion 803. The guide protrusion 801 is formed at the lower end of the hinge cap 80 while extending in the longitudinal direction of the hinge cap 80 such that the guide protrusion 801 can be guided along the guide groove 802. The guide groove 802 is formed at the outer circumference of the hinge housing 30 while extending in the circumferential direction of the hinge housing 30 such that the guide protrusion 801 can be guided along the guide groove 802. The stopper protrusion 803 is formed at either end of the guide groove 802 such that the movement of the guide protrusion 801 guided along the guide groove 802 is stopped by the stopper protrusion 803.

Referring back to FIGS. 1 and 2, the hinge cap 80 is provided at a predetermined position of the outer circumference thereof with a first circuit hole 84, through which a flexible circuit (not shown) passes. The first circuit hole 84 of the hinge cap 80 extends in the longitudinal direction of the hinge cap 80. Similarly, the hinge housing 30 is provided at a predetermined position of the outer circumference thereof with a second circuit hole 32, through which the flexible circuit having passed through the first circuit hole 84 passes.

Also, the hinge housing 30 is provided around the outer circumference thereof with at least one fixing groove 31, as shown in FIG. 1.

The operation of the locking apparatus of the swing hinge module for mobile communication terminals with the above-stated construction according to the preferred embodiment of the present invention will now be described in detail with reference to FIGS. 1 to 10.

As shown in FIGS. 1 and 2, the hinge shaft 40, the first and second hinge cam 50 and 60, and the coil spring 70 are successively disposed in the accommodating space of the hinge housing 30. As shown in FIG. 1, the hinge cap 80 is attached to the hinge housing 30 while the hinge cap 80 surrounds the outer circumference of the hinge housing 30 through the open end of the hinge cap 80. As shown in FIGS. 2 and 3, the head 41 of the hinge shaft 40 is inserted through the cap-side through-hole 83 formed at the closed end of the hinge cap 80. Next, the head 41 of the hinge shaft 40 is also inserted through the plate-side through-hole 92 formed at the center of the hinge fixing plate 90, as shown in FIGS. 3 and 4. As shown in FIG. 1, the tail part of the hinge shaft 40 is protruded out of the lower end of the hinge housing 30, and then an E-ring 95 is fitted on the outer circumference of the tail part.

As shown in FIGS. 3 and 4, the shaft-side engaging groove 41a is formed at the head 41 of the hinge shaft 40 such that the hinge fixing plate 90 is engaged with the shaft-side engaging groove 41a after the head 41 of the hinge shaft 40 is inserted through the plate-side through-hole 92 of the hinge fixing plate 90. Consequently, the hinge fixing plate 90 is engaged with the shaft-side engaging groove 41a of the hinge shaft 40 while the head 41 of the hinge shaft 40 is inserted through the plate-side through-hole 92 of the hinge fixing plate 90.

As shown in FIG. 4, the head 41 of the hinge shaft 40 is rotated 90 degrees after the head 41 is inserted through the plate-side through-hole 92 of the hinge fixing plate 90. At the same time, the second fixing pieces 91 formed at the outer circumference of the hinge fixing plate 90 are located such that the second fixing pieces 91 exactly correspond to the first fixing pieces 81 formed at the outer circumference of the hinge cap 80, as shown in FIGS. 4 and 5. Subsequently, the second fixing pieces 91 are securely fixed to the first fixing pieces 81 by means of the screws 700, as shown in FIG. 1. As a result, the hinge fixing plate 90 is fixed to the hinge cap 80 while the hinge fixing plate 90 is opposite to the hinge cap 80.

As shown in FIG. 5, the first and second fixing pieces 81 and 91 are uniformly spaced apart from each other, respectively, about the hinge axis A1 of the hinge shaft 40 such that the first and second fixing pieces 81 and 91 are arranged as corners of an equilateral triangle. Consequently, the first and second fixing pieces 81 and 91 are provided with three fixing points each.

Figure 6:
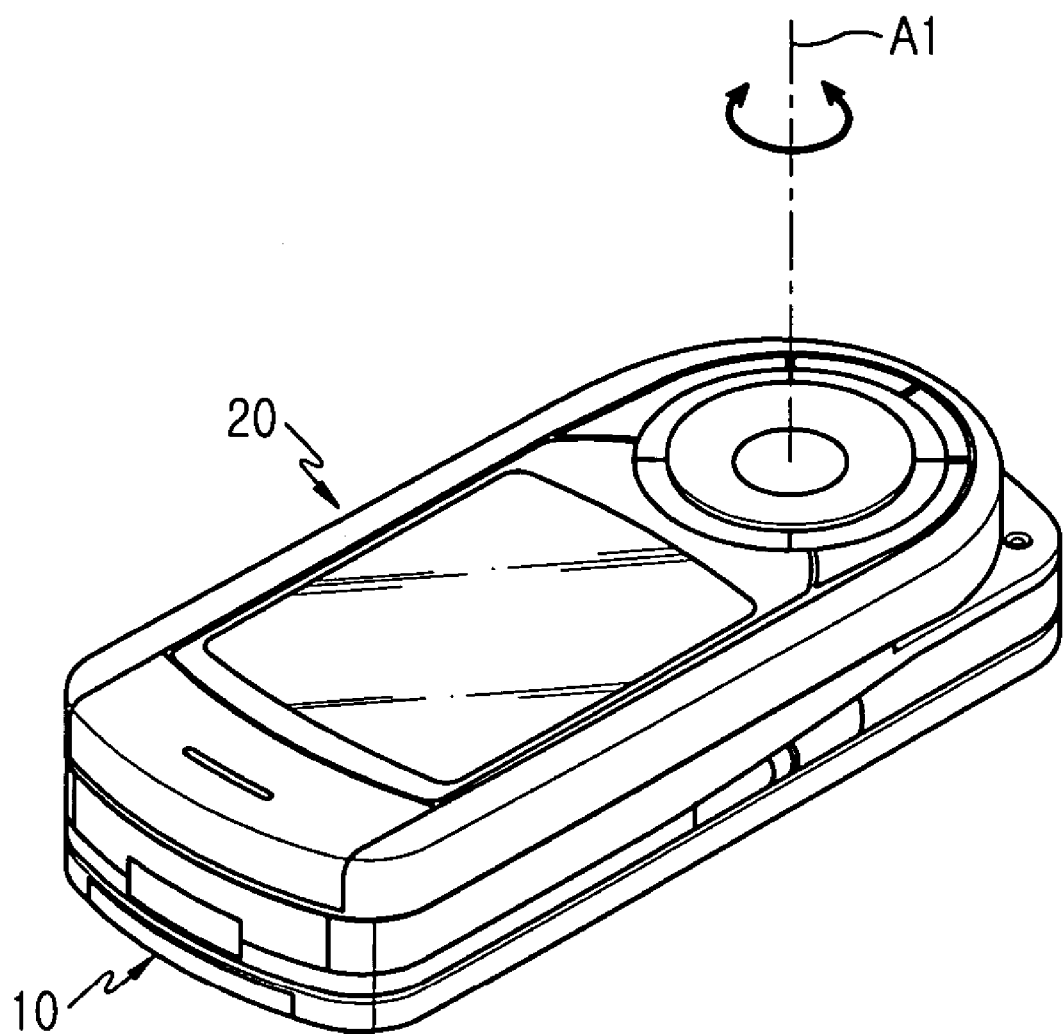
FIG. 6 is a perspective view showing the swing hinge module for mobile communication terminals according to the preferred embodiment of the present invention before a second housing is rotated.
Figure 8:
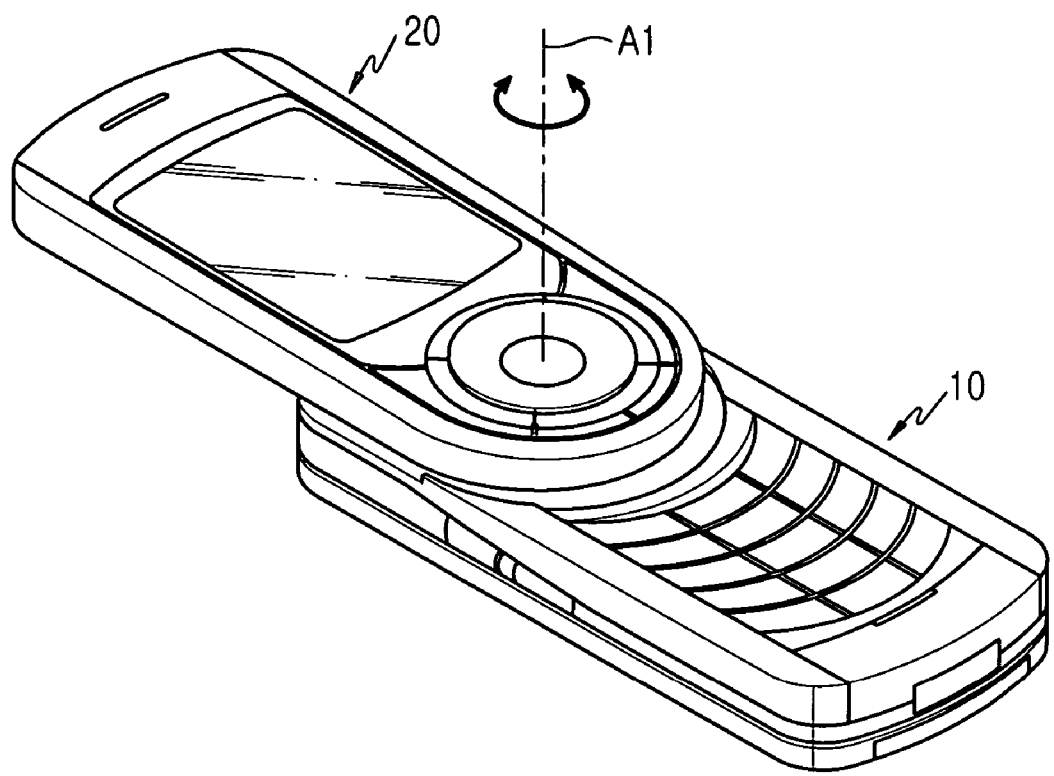
FIG. 8 is a perspective view showing the swing hinge module for mobile communication terminals according to the preferred embodiment of the present invention after the second housing is rotated 180 degrees.

The three fixing points disperse a fixing force of the hinge housing 30, the hinge shaft 40 and the hinge cap 80 in three directions, as shown in FIGS. 6 and 8. Consequently, damage to the hinge module and decrease of the fixing force, which may be caused due to repetitive rotation of the first and second housings 10 and 20, are effectively prevented.

Figure 7:
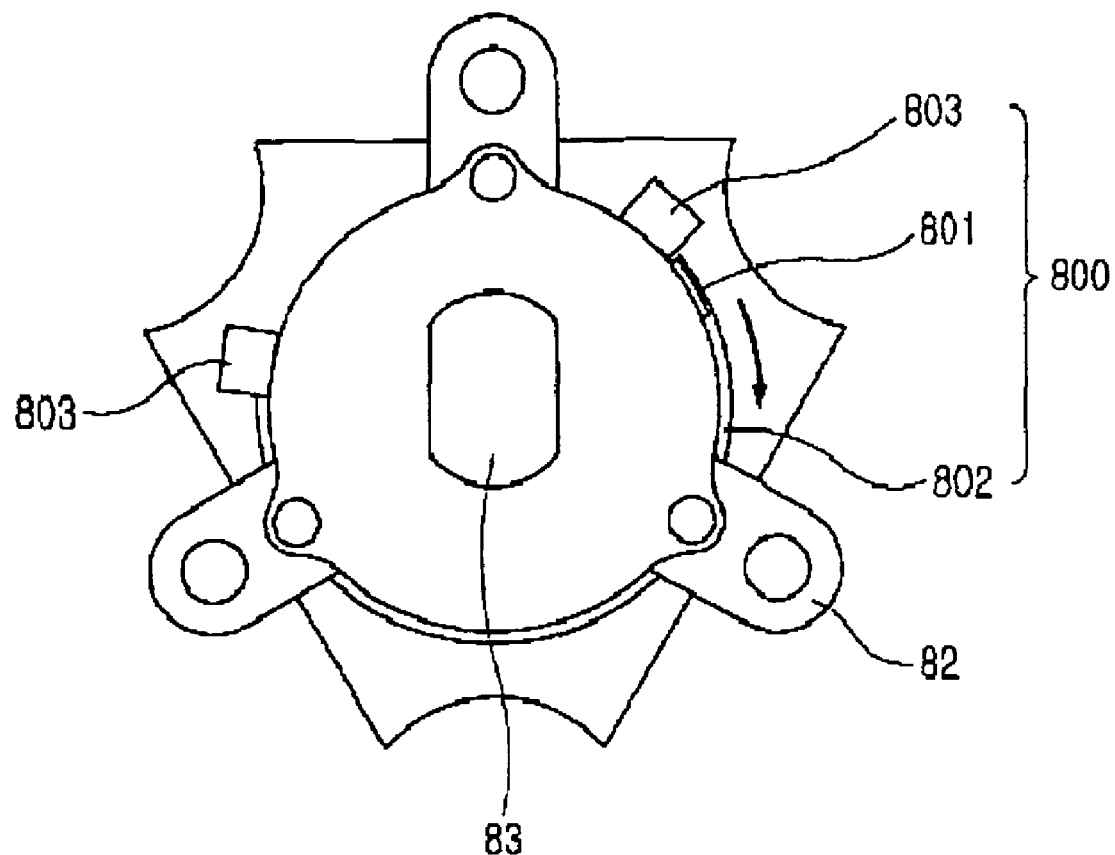
FIG. 7 is a plan view showing a hinge stopper of the locking apparatus of the swing hinge module for mobile communication terminals according to the preferred embodiment of the present invention before the hinge stopper is rotated.
Figure 9:
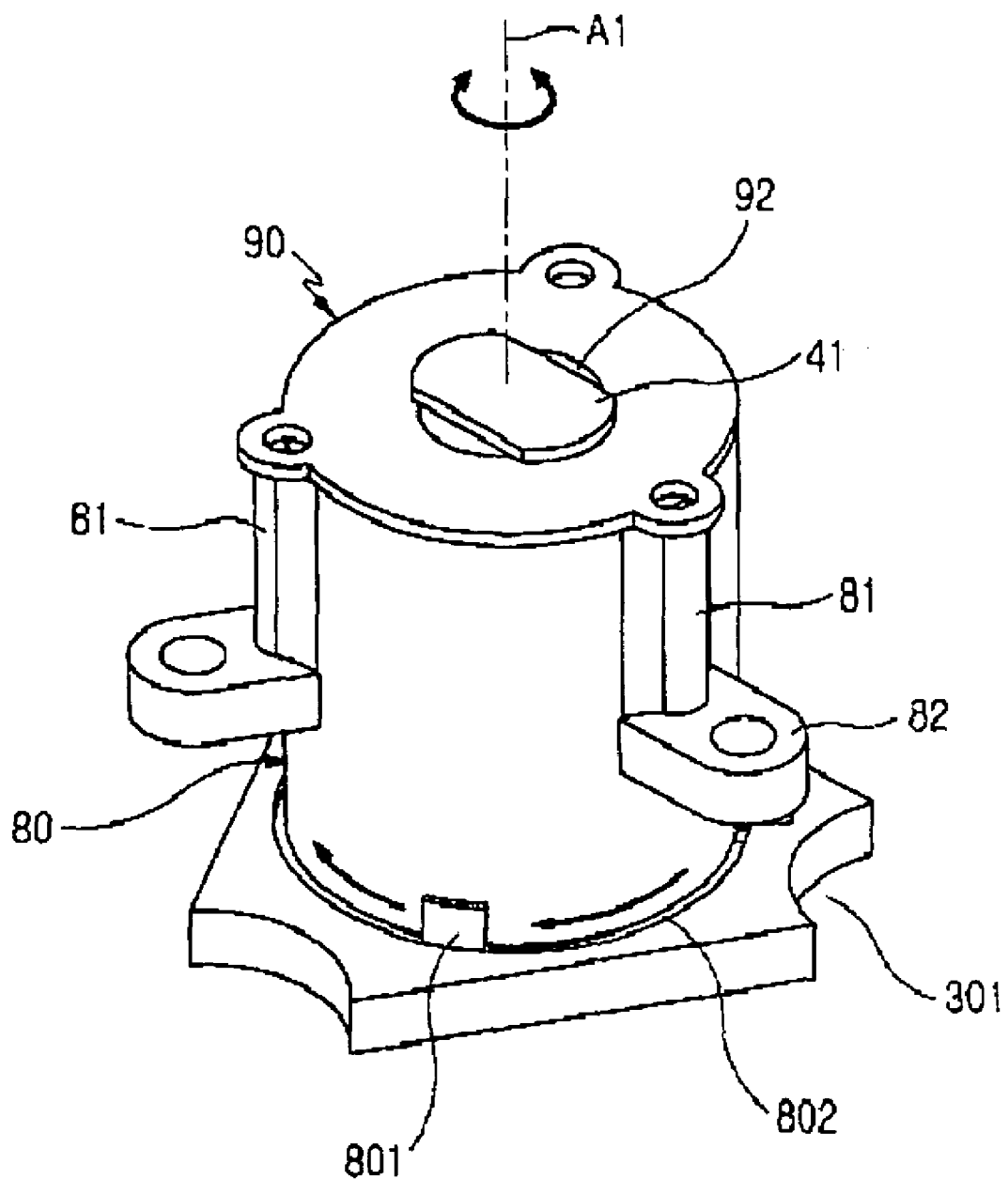
FIG. 9 is a perspective view showing the hinge stopper of the locking apparatus of the swing hinge module for mobile communication terminals according to the preferred embodiment of the present invention before the hinge stopper is operated.

As shown in FIGS. 7 and 9, the guide protrusion 801 is formed at the lower end of the hinge cap 80 while extending in the longitudinal direction of the hinge cap 80. The guide protrusion 801 is guided along the guide groove 802 formed at the outer circumference of the hinge housing 30 in the circumferential direction of the hinge housing 30.

Figure 10:
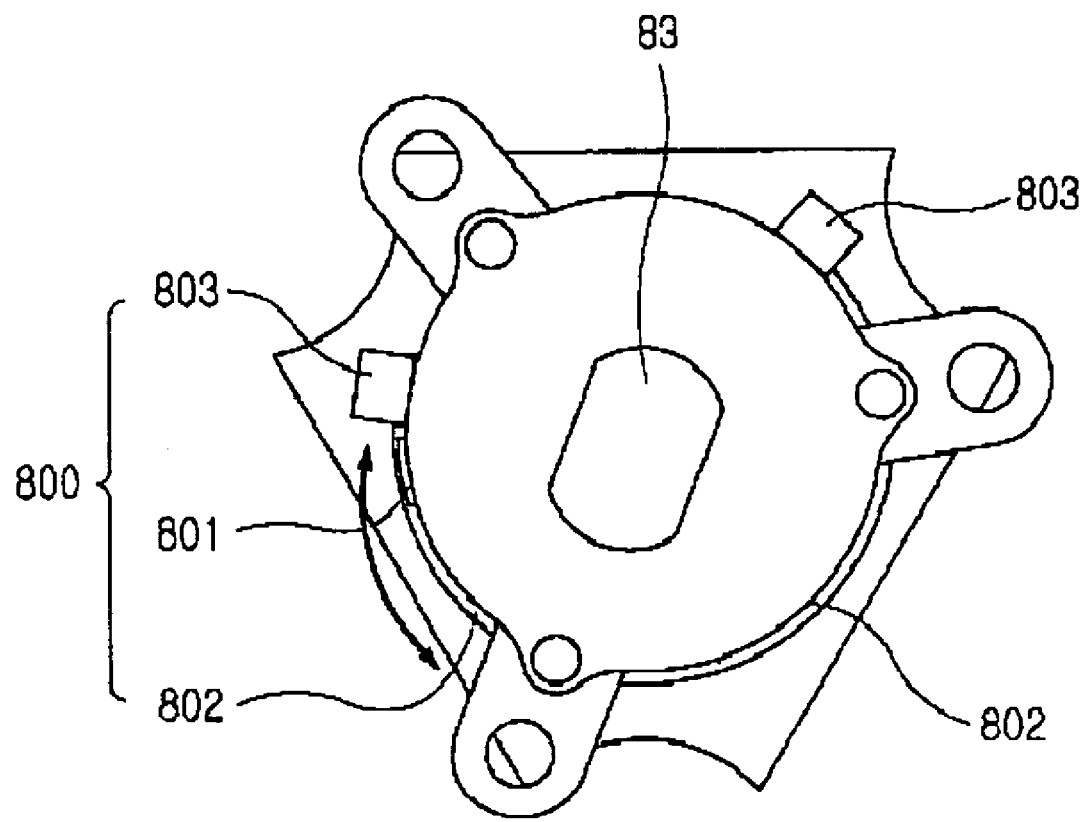
FIG. 10 is a plan view showing the hinge stopper of the locking apparatus of the swing hinge module for mobile communication terminals according to the preferred embodiment of the present invention after the hinge stopper is operated.

As shown in FIGS. 9 and 10, the movement of the guide protrusion 801 guided along the guide groove 802 is stopped by the stopper protrusion 803 at either end of the guide groove 802. Consequently, the rotation of the hinge cap 80 is stopped.

The operation of a locking apparatus of a swing hinge module for mobile communication terminals according to another preferred embodiment of the present invention will now be described in detail with reference to FIGS. 11 to 16.

Figure 11:
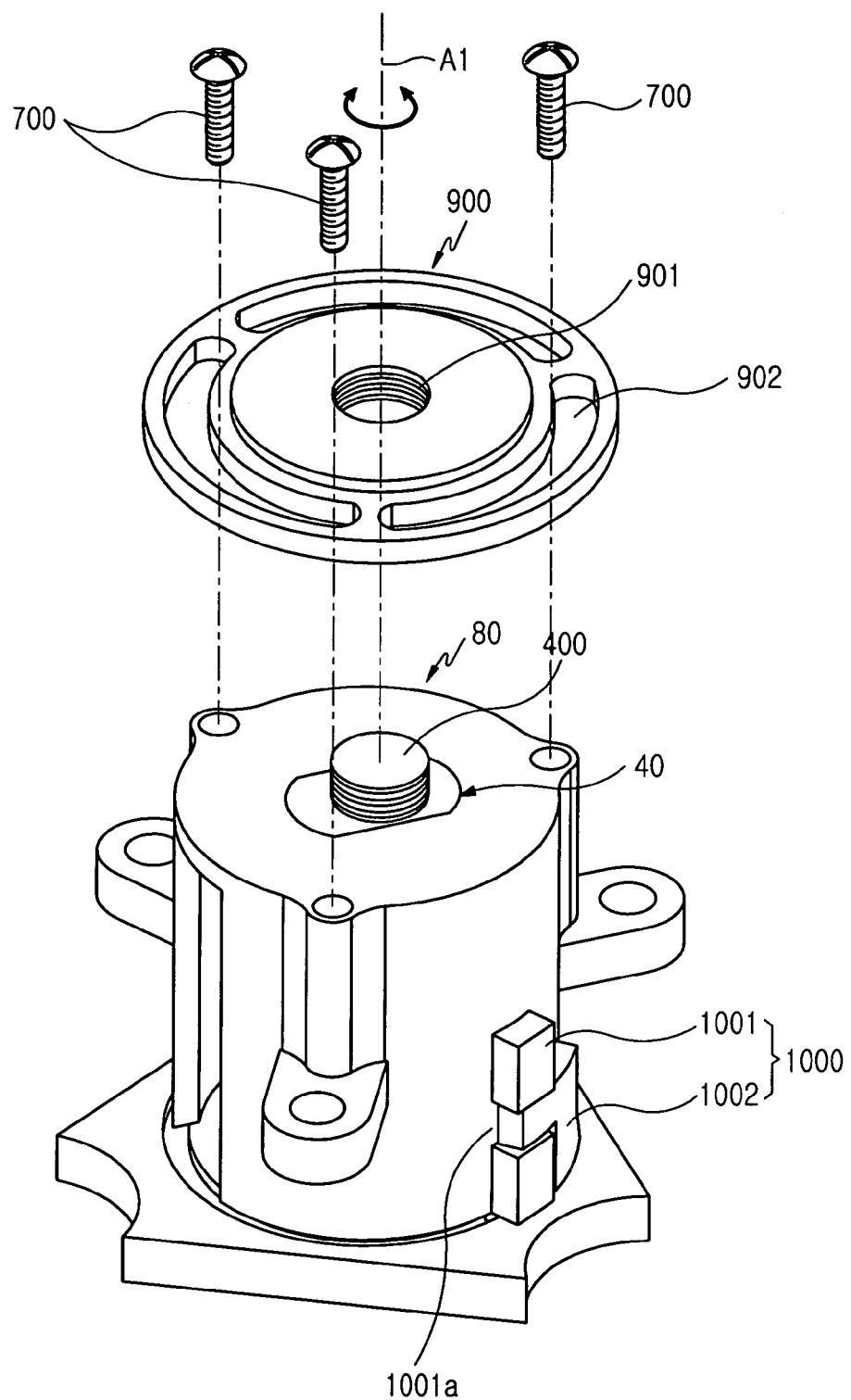
FIG. 11 is an exploded perspective view showing a hinge cap and a hinge fixing plate of a locking apparatus of a swing hinge module for mobile communication terminals according to another preferred embodiment of the present invention before the hinge cap and the hinge fixing plate are assembled.
Figure 12:
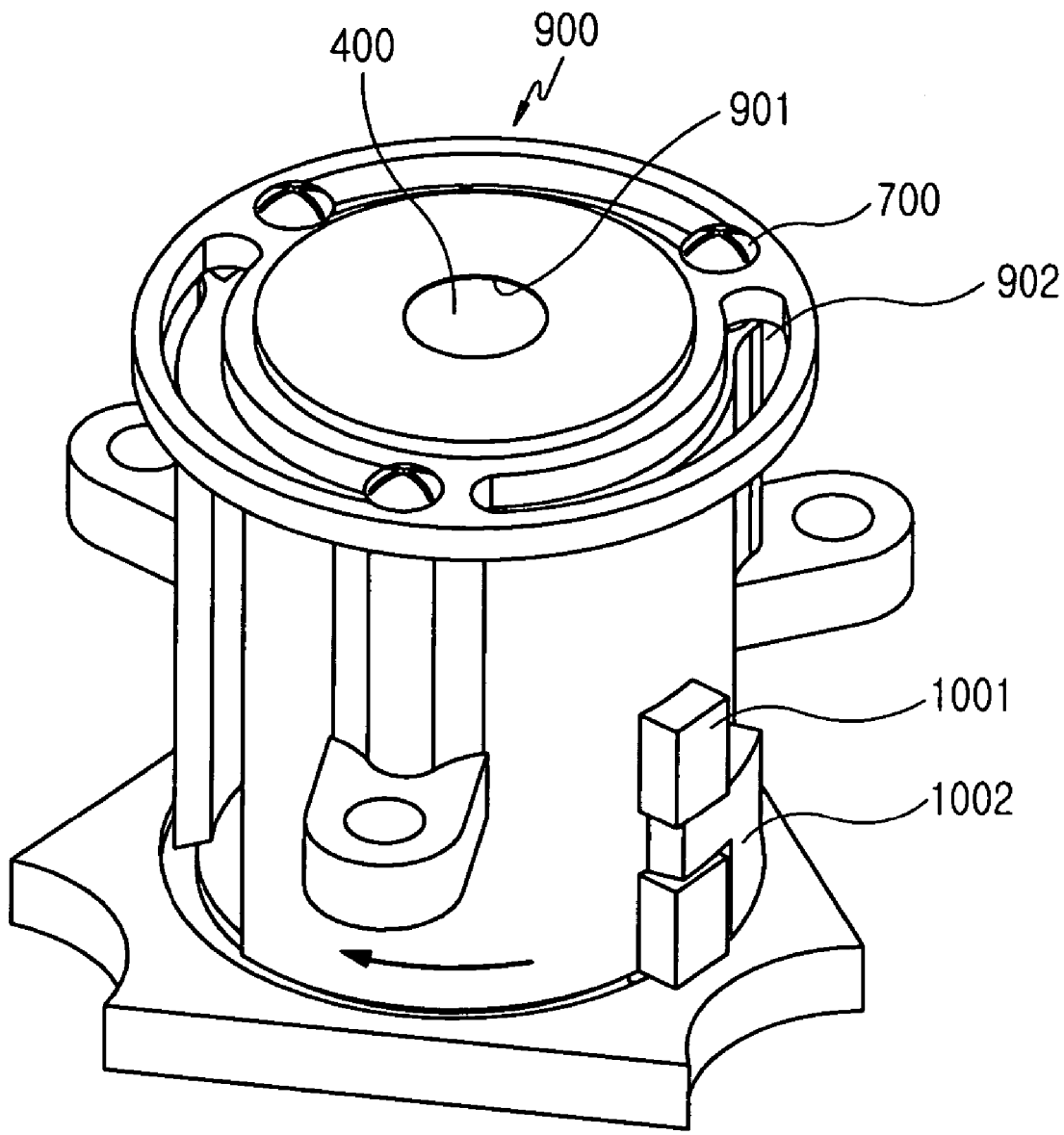
FIG. 12 is a perspective view showing assembly of the hinge cap and the hinge fixing plate of the locking apparatus of the swing hinge module for mobile communication terminals according to the preferred embodiment of the present invention shown in FIG. 11.

As shown in FIGS. 11 and 12, a hinge fixing plate 900 is engaged with a screw part 400 of the hinge shaft 40, which is inserted through the cap-side through-hole 83 formed at the closed end of the hinge cap 80. The screw part 400 is formed at the center part of the head of the hinge shaft 40.

At the center of the hinge fixing plate 900 is formed a first screw hole 901 as shown in FIG. 11. The screw part 400 of the hinge shaft 40 is engaged into the first screw hole 901 of the hinge fixing plate 900, by which the hinge fixing plate 900 is securely fixed to the hinge shaft 40.

At least one second screw hole 902 is formed at the hinge fixing plate 90 around the first screw hole 901. After the second screw hole 902 is arranged such that the second screw hole 902 communicates with a screw hole formed at a first fixing piece 81 of the hinge cap 80, the screw 700 is engaged into the second screw hole 902 and the screw hole of the first fixing piece 81 of the hinge cap 80. While the hinge fixing plate 900 is opposite to the upper end of the hinge cap 80, the hinge cams 50 and 60 are securely fixed to the hinge housing 30.

Figure 13:
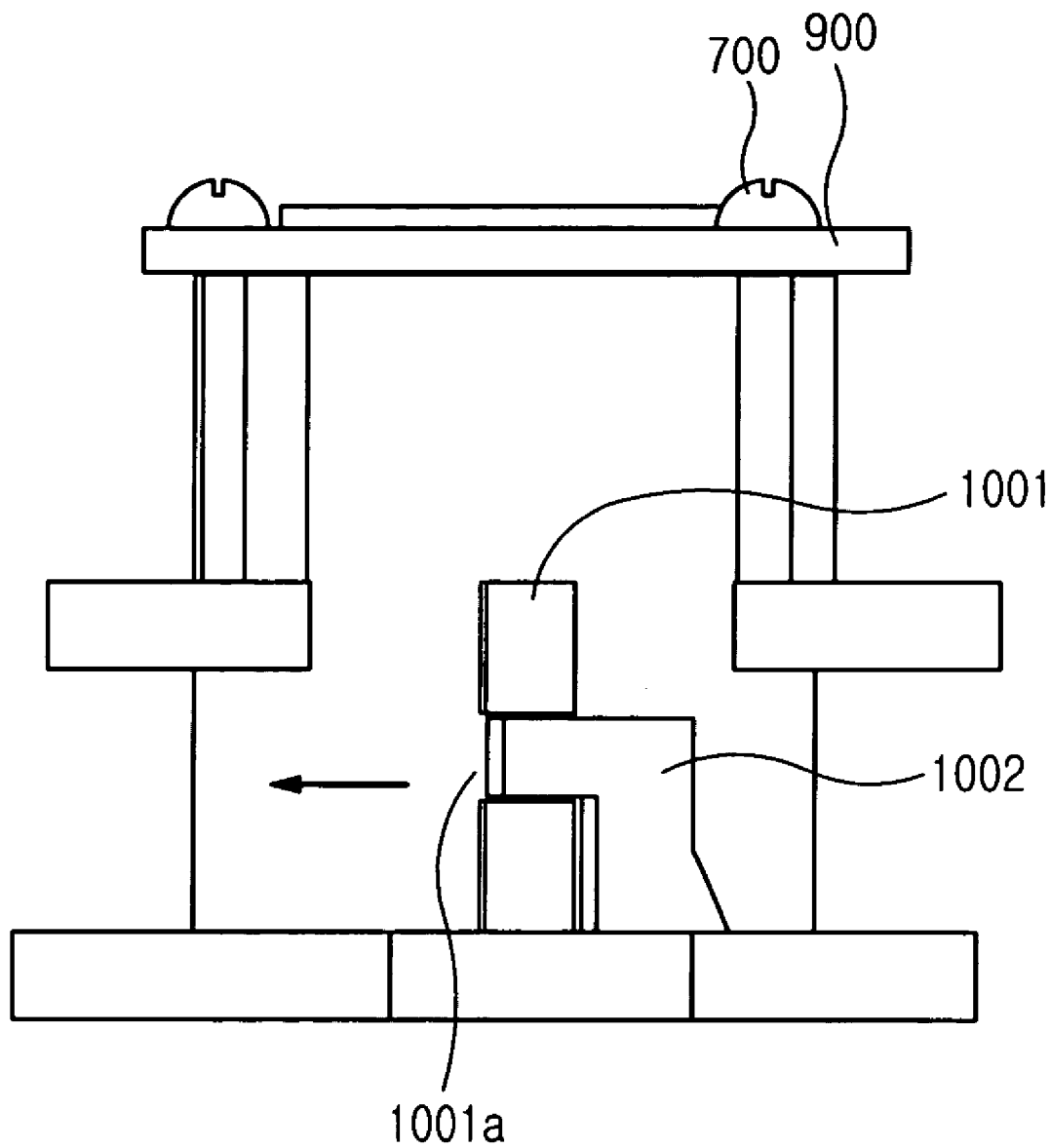
FIG. 13 is a side view showing a hinge stopper of the locking apparatus of the swing hinge module for mobile communication terminals according to the preferred embodiment of the present invention shown in FIG. 11 before the hinge stopper is rotated.
Figure 14:
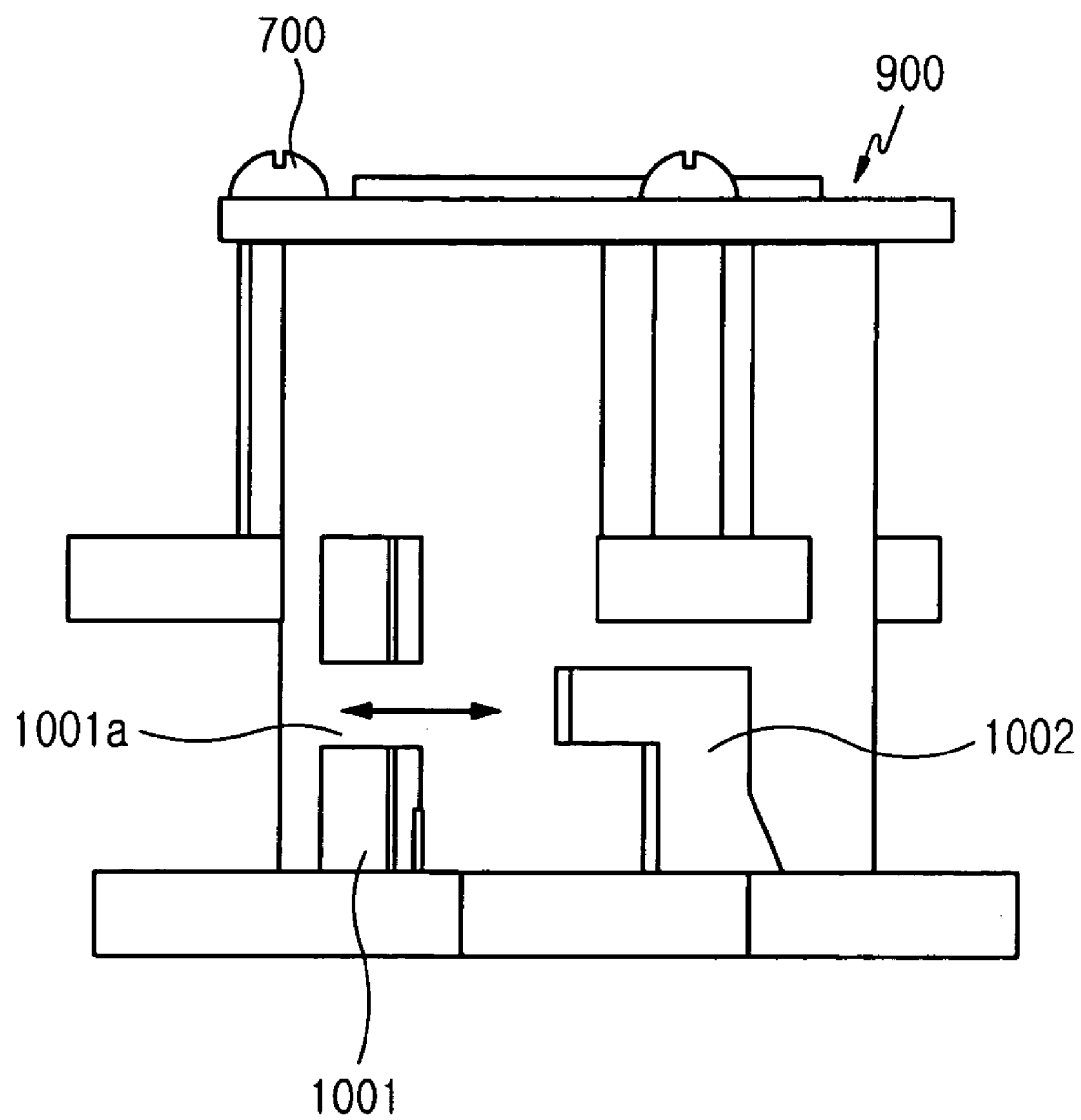
FIG. 14 is a side view showing the hinge stopper of the locking apparatus of the swing hinge module for mobile communication terminals according to the preferred embodiment of the present invention shown in FIG. 11 while the hinge stopper is rotated.

When the hinge cap 80 is rotated as shown in FIGS. 13 and 14, first and second lockers 1002 and 1003 are inserted into, separated from, and contact a rotating locking member 1001 of the hinge cap 80 to restrict the rotation range of the hinge cap 80. Accordingly, a hinge stopper 1000 is provided.

The rotating locking member 1001 is formed at a predetermined position of the outer circumference of the hinge cap 80. When the hinge cap 80 is rotated, the rotating locking member 1001 is separated from the first locker 1002 formed at the hinge housing 30.

Figure 15:
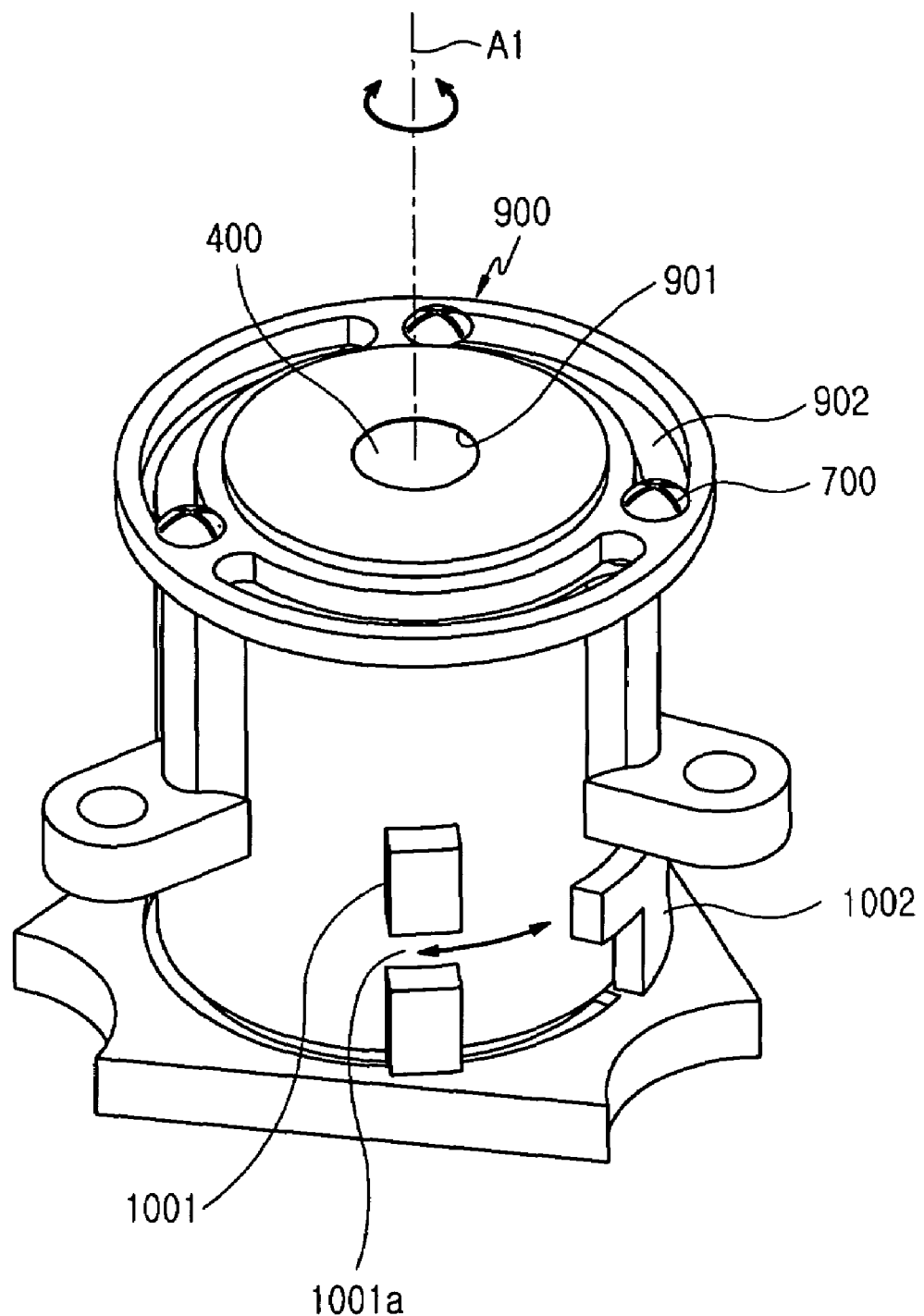
FIG. 15 is a perspective view showing the hinge stopper of the locking apparatus of the swing hinge module for mobile communication terminals according to the preferred embodiment of the present invention shown in FIG. 11 while the hinge stopper is rotated.

At the rotating locking member 1001 is provided a locking groove 1001a, into or from which the first locker 1002 is inserted or separated, as shown in FIG. 15. Consequently, the first locker 1002 is separated from the locking groove 1001a of the rotating locking member 1001.

Figure 16:
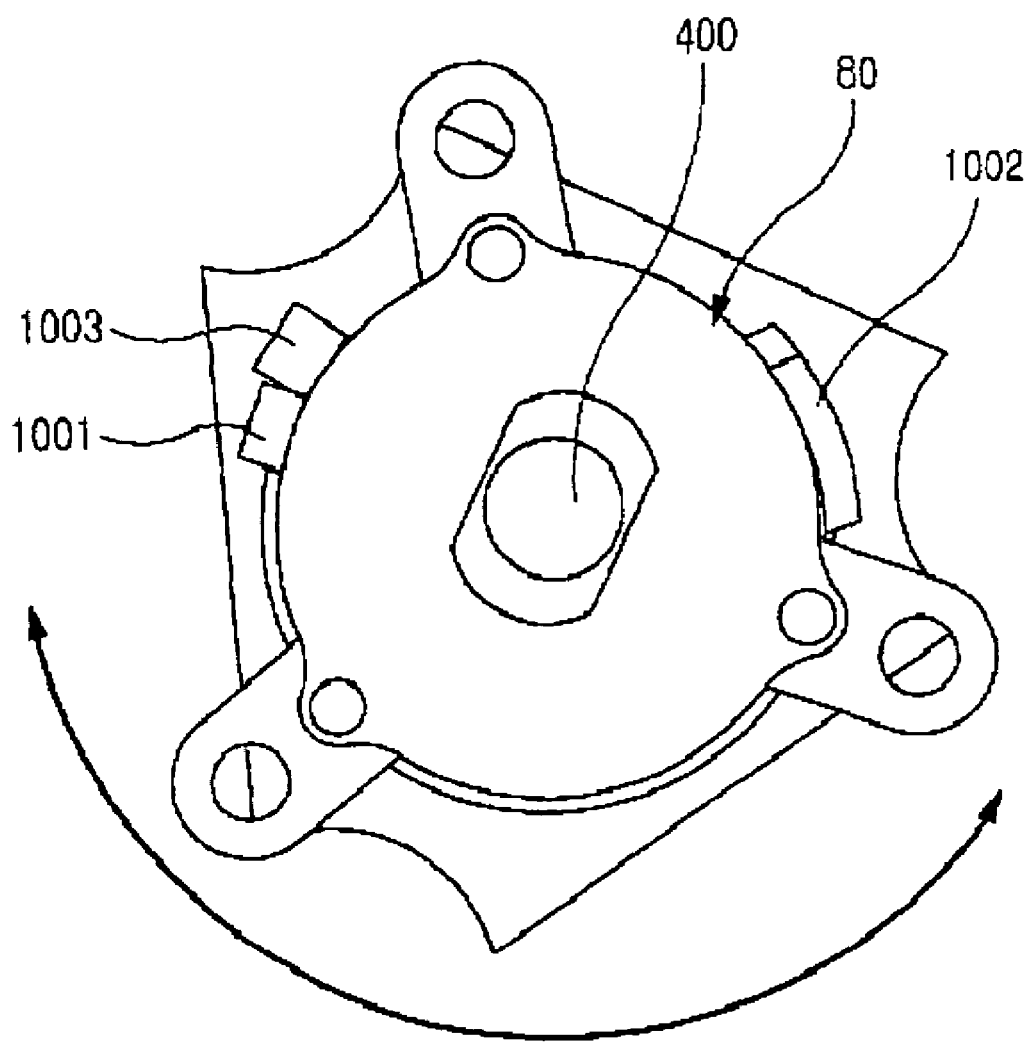
FIG. 16 is a top plan view showing the hinge stopper of the locking apparatus of the swing hinge module for mobile communication terminals according to the preferred embodiment of the present invention shown in FIG. 11 after the hinge stopper is rotated.

The first locker 1002 is preferably formed in an L-shape. The rotating locking member 1001 is rotated along with the hinge cap80, as shown in FIG. 16. The second locker 1003 is formed at the hinge housing 30 such that the second locker 1003 contacts the rotating locking member 1001 to restrict the rotation range of the rotating locking member 1001. When the hinge cap 80 is rotated 180 degrees, the rotating locking member 1001 contacts the second locker 1003, whereby the rotation of the rotating locking member 1001 is stopped.

When the hinge cap 80 is rotated in the opposite direction, the first locker 1002 is inserted into the locking groove 1001a of the rotating locking member 1001. Consequently, the hinge cap 80 is returned to its original position.

As apparent from the above description, the present invention provides a locking apparatus of a swing hinge module including a hinge fixing plate fixed to a hinge shaft of the swing hinge module. Consequently, the present invention has the effect that the fixing force of the swing hinge module is improved, and thus durability of the mobile communication terminal is improved. Also, the present invention provides a locking apparatus of a swing hinge module including a hinge stopper that restricts the rotation range of the hinge cap as the lockers are inserted into or separated from the hinge cap. Consequently, the present invention has the effect that a function of the swing hinge module as the stopper is improved, the fatigue of the stopper is reduced, and thus the service life of the swing hinge module is increased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A locking apparatus of a swing hinge module for a mobile communication terminal having first and second housings rotatably connected to each other by means of the swing hinge module, the swing hinge module including a hinge housing, a hinge shaft, a hinge cam, and a coil spring, the hinge shaft, the hinge cam and the coil spring being successively disposed in the hinge housing, wherein the locking apparatus comprises:
    a hinge cap extending in a longitudinal direction thereof, the hinge cap having a closed end adapted to allow a head of the hinge shaft to be inserted through the closed end of the hinge cap, and an open end whereby the hinge cap is attached to the hinge housing while the hinge cap surrounds the outer circumference of the hinge housing through the open end of the hinge cap; and
    a hinge fixing plate engaged with the head of the hinge shaft while adjacent to the hinge cap, the hinge housing and the hinge cap being fixed to each other by means of the hinge fixing plate when rotated relative to the hinge fixing plate, wherein the hinge cap is provided at a predetermined position of the outer circumference thereof with a first circuit hole extending in the longitudinal direction of the hinge cap for allowing a flexible circuit to pass therethrough, and the hinge housing is provided at a predetermined position of the outer circumference thereof with a second circuit hole for allowing the flexible circuit having passed through the first circuit hole to pass therethrough.

2. The apparatus as set forth in claim 1, wherein the hinge cap is provided at the outer circumference thereof with at least one first fixing piece extending in the longitudinal direction of the hinge cap, and the hinge fixing plate is provided at the Outer circumference thereof with at least one second fixing piece corresponding to the at least one first fixing piece, the first and second fixing pieces being connected to each other.

3. The apparatus as set forth in claim 2, wherein the first and second fixing pieces are each provided with three fixing points uniformly and equidistantly spaced apart from each other about a hinge axis of the hinge shaft.

4. The apparatus as set forth in claim 1, wherein the hinge cap is provided at the outer circumference thereof with at least one cap-side fixing member fixed to the second housing.

5. The apparatus as set forth in claim 1, wherein the head of the hinge shaft has a shaft-side engaging groove formed such that the hinge fixing plate is engaged with the shaft-side engaging groove after the head of the hinge shaft is inserted through a plate-side through-hole formed at the hinge fixing plate.

6. The apparatus as set forth in claim 1, wherein the hinge cap is provided at the center thereof with a cap-side through-hole to allow the head of the hinge shaft to be inserted therethrough.

7. The apparatus as set forth in claim 1, wherein the hinge fixing plate is provided at the center thereof with a plate-side through-hole for allowing the head of the hinge shaft to be inserted therethrough such that the hinge fixing plate is engaged with a shaft-side engaging groove formed at the hinge shaft after the head of the hinge shaft is inserted through the plate-side through-hole of the hinge fixing plate.

8. The apparatus as set forth in claim 1, wherein the head of the hinge shaft is rotatable ninety degrees after the head is inserted through the plate-side through-hole of the hinge fixing plate.

9. The apparatus as set forth in claim 1, further comprising a hinge stopper disposed between the hinge cap and the hinge housing for restricting rotation of the hinge cap.

10. The apparatus as set forth in claim 9, wherein the hinge stopper comprises:
at least one guide protrusion formed on a lower end of the hinge cap while extending in the longitudinal direction of the hinge cap;
a guide groove formed at the outer circumference of the hinge housing while extending in the circumferential direction of the hinge housing for guiding the at least one guide protrusion; and
at least one stopper protrusion formed at either end of the guide groove for stopping movement of the guide protrusion guided along the guide groove.

11. The apparatus as set forth in claim 1, wherein the hinge housing is provided around the outer circumference thereof with at least one fixing groove.

12. The apparatus as set forth in claim 1, wherein the head of the hinge shaft has a shaft-side engaging groove formed to lock the hinge fixing plate to the hinge shaft, whereby insertion of the head of the hinge shaft through a plate-side through-hole defined through the hinge fixing plate and rotation of the hinge fixing plate relative to the hinge shaft locks through the hinge fixing plate within the plate-side through-hole.

13. A swing hinge module for a mobile communication terminal including a first housing and a second housing connected to the first housing such that the second housing can be rotated relative to the first housing about a hinge axis while facing the first housing, wherein the swing hinge module comprises:
a hinge housing extending in a longitudinal direction thereof, the hinge housing having an accommodating space defined therein;
a hinge shaft rotatably attached to the hinge housing, the hinge shaft being disposed in the accommodating space of the hinge housing;
a first hinge cam disposed in the hinge housing such that the first hinge cam can move linearly in the longitudinal direction of the hinge housing;
a second hinge cam fixedly attached to one end of the hinge shaft such that the second hinge cam can be rotated in the hinge housing;
a coil spring disposed in the hinge housing for applying an elastic force to the first hinge cam to move the first and second hinge cams toward each other;
a hinge cap extending in the longitudinal direction thereof, the hinge cap having a closed end formed to allow a head of the hinge shaft to be inserted through the closed end of the hinge cap, and an open end formed to allow the hinge cap to be attached to the hinge housing while the hinge cap surrounds the outer circumference of the hinge housing through the open end of the hinge cap; and
a hinge fixing plate engaged with the head of the hinge shaft adjacent to the hinge cap, the hinge housing and the hinge cap being fixed to each other by means of the hinge fixing plate when rotated relative to the hinge fixing plate.

14. The module as set forth in claim 13, wherein the hinge cap is provided at the outer circumference thereof with at least one first fixing piece extending in the longitudinal direction of the hinge cap, and the hinge fixing plate is provided at the outer circumference thereof with at least one second fixing piece corresponding to the at least one first fixing piece, the first and second fixing pieces being connected to each other.

15. The module as set forth in claim 14, wherein the first and second fixing pieces are each provided with three fixing points, uniformly and equidistantly spaced apart from each other about a hinge axis of the hinge shaft.

16. The module as set forth in claim 13, wherein the first hinge cam is provided at one end thereof with a crest part and the second hinge cam is provided with a valley part corresponding to the crest part of the first hinge cam.

17. A locking apparatus of a swing hinge module for a mobile communication terminal having first and second housings rotatably connected to each other by means of the swing hinge module, the locking apparatus comprising:
a hinge cap extending in a longitudinal direction thereof, the hinge cap having a closed end with a hole defined therethrough to accommodate a head of a hinge shaft inserted through, and an open end to accommodate a hinge housing when the hinge housing is attached to the hinge cap; and
a hinge fixing plate having a hole defined therethrough to engage the head of the hinge shaft, the hinge fixing plate being adjacent to the hinge cap so that the hinge housing and the hinge cap are detachably fixed to each other by locking the head of the hinge shaft to the hinge fixing plate, wherein the hinge cap is provided at a predetermined position of the outer circumference thereof with a first circuit hole extending in the longitudinal direction of the hinge cap for allowing a flexible circuit to pass therethrough, and the hinge housing is provided at a predetermined position of the outer circumference thereof with a second circuit hole for allowing the flexible circuit having passed through the: first circuit hole to pass therethrough.

18. A locking apparatus of a swing hinge module for a mobile communication terminal having first and second housings rotatably connected to each other by means of the swing hinge module, the swing hinge module including a hinge housing, a hinge shaft, first and second hinge cams, and a coil spring, the hinge shaft, the first and second hinge cams and the coil spring being successively disposed in the hinge housing, wherein the locking apparatus comprises:
a hinge cap extending in a longitudinal direction thereof, the hinge cap having a closed end formed such that a head of the hinge shaft inserted through the closed end of the hinge cap and an open end formed such that the hinge cap is attached to the hinge housing while the hinge cap surrounds the outer circumference of the hinge housing through the open end of the hinge cap;

a hinge fixing plate engaged with a center part of the head of the hinge shaft while being opposite to the upper end of the hinge cap, wherein the hinge housing and the first and second hinge cams are fixed to each other by the hinge fixing plate; and a hinge stopper inserted into and separated from the hinge cap as the hinge cap is rotated, the hinge stopper contacting the hinge cap when the hinge stopper is separated from the hinge cap for restricting a rotation range of the hinge cap, wherein the hinge cap is provided at a predetermined position of the outer circumference thereof with a first circuit hole extending in the longitudinal direction of the hinge can for allowing a flexible circuit to pass therethrough, and the hinge housing is provided at a predetermined position of the outer circumference thereof with a second circuit hole for allowing the flexible circuit having passed through the first circuit hole to pass therethrough.

19. The apparatus as set forth in claim 18, wherein the hinge shaft is provided at the center part of the head thereof with a screw part inserted through a cap-side through-hole formed in the hinge cap.

20. The apparatus us set forth in claim 19, wherein the hinge fixing plate is provided at the center thereof with a first screw hole that allows the screw part of the hinge shaft to be engaged therethrough, and the hinge fixing plate is provided with at least one second screw hole, the second screw being arranged around the first screw hole securely fixing the hinge fixing plate to a first fixing piece of the hinge cap by means of a screw inserted through the second screw hole.

21. The apparatus as set forth in claim 18, wherein the hinge stopper comprises:

a rotating locking member formed at a predetermined position of the outer circumference of the hinge cap in the longitudinal direction of the hinge cap;

a first locker formed on the hinge housing; wherein the first locker is inserted into and separated from the rotating locking member; and a second locker formed on the hinge housing for contacting the rotating locking member to restrict the rotational range of the rotating locking member.

22. The apparatus as set forth in claim 21, wherein the rotating locking member is provided at a middle thereof with a locking groove, the first locker being inserted into and separated from the locking groove.

23. The apparatus as set forth in claim 21, wherein the first locker is formed in an L-shape.

* * * * *

UNITED STATES PATENT AND TRADEMARK OFFICE
CERTIFICATE OF CORRECTION

PATENT NO. : 7,590,435 B2 Page 1 of 1
APPLICATION NO. : 11/132911
DATED : September 15, 2009
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this

Twenty-first Day of September, 2010

David J. Kappos
*Director of the United States Patent and Trademark Office*